May 5, 1942.  C. J. HUG  2,282,227
CHASSIS FRAME
Filed Jan. 6, 1941   2 Sheets-Sheet 1

Christian J. Hug,
INVENTOR
BY Victor J. Evans & Co.
ATTORNEYS

May 5, 1942.  C. J. HUG  2,282,227
CHASSIS FRAME
Filed Jan. 6, 1941   2 Sheets-Sheet 2
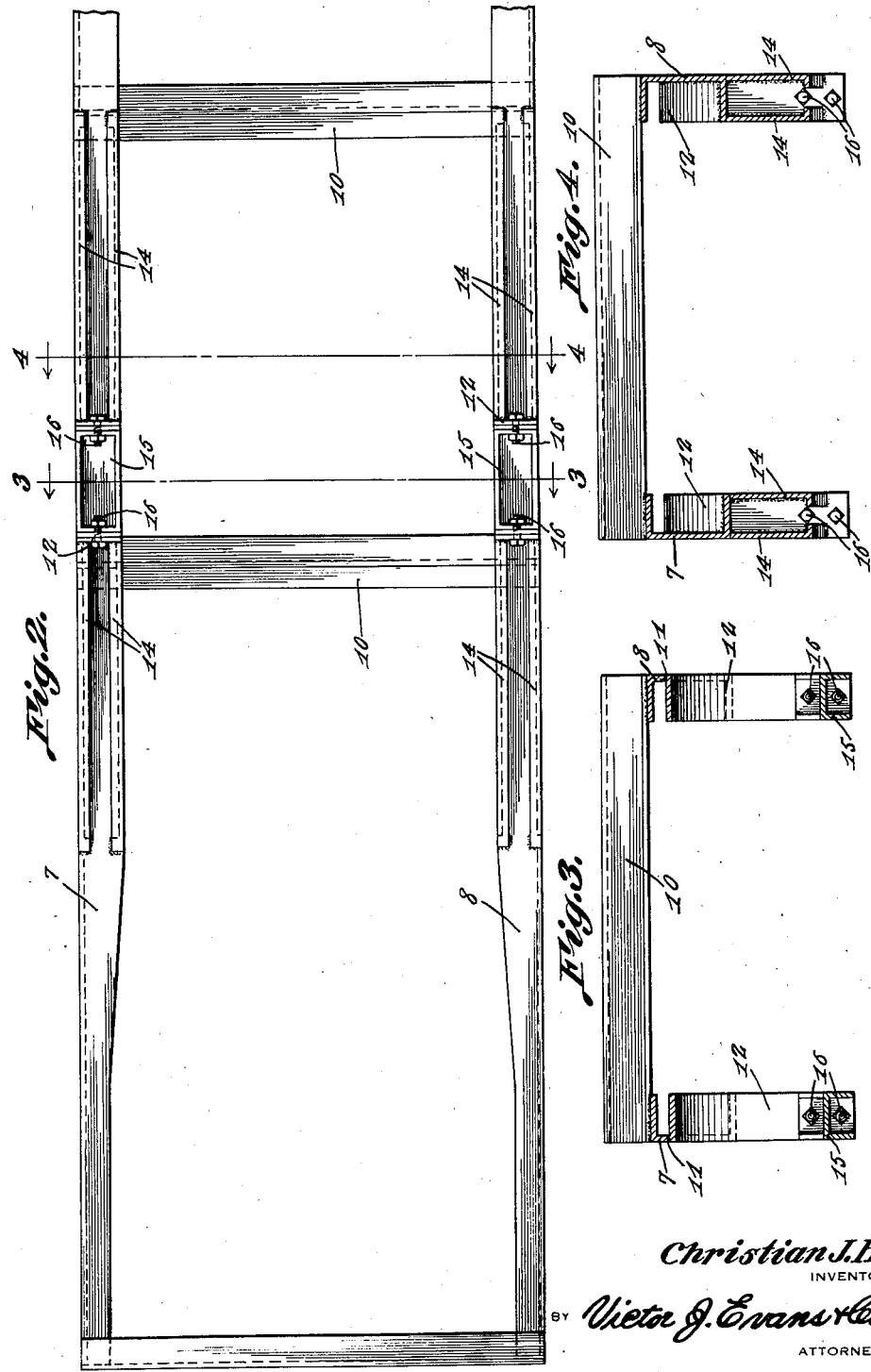
Christian J. Hug,
INVENTOR
BY Victor J. Evans & Co.
ATTORNEYS Patented May 5, 1942

2,282,227

UNITED STATES PATENT OFFICE 2,282,227

CHASSIS FRAME

Christian J. Hug, Highland, Ill.

Application January 6, 1941, Serial No. 373,365

3 Claims. (Cl. 280—106)

The present invention relates to chassis frames for vehicles and more particularly to frames for motor vehicles.

The primary object of the invention is to provide a chassis frame for heavy duty trucks, such as motor trucks and busses of the pusher type which will materially add to the strength and stability of the chassis frames. In trucks and busses of this type, the narrow part of the frame usually passes over the rear axle to permit a low mounting for the body and in accordance with the present invention, the frame is strengthened to such an extent that it will substantially eliminate breaking of the bus or truck body at the roof thereof.

Another object of the invention is to provide a chassis frame including means for mounting the rear axle for floating movement, whereby weaving of the chassis frame when the vehicle passes over inequalities in the surface of the road will not impart an abnormal stress or strain on the body which quite frequently results in breaking of the body at the roof.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 2 is a bottom plan view of the chassis frame.

Figure 3 is a transverse sectional view taken substantially on line 3—3 of Figure 2.

Figure 4 is a transverse sectional view taken substantially on line 4—4 of Figure 2.

Figure 1:
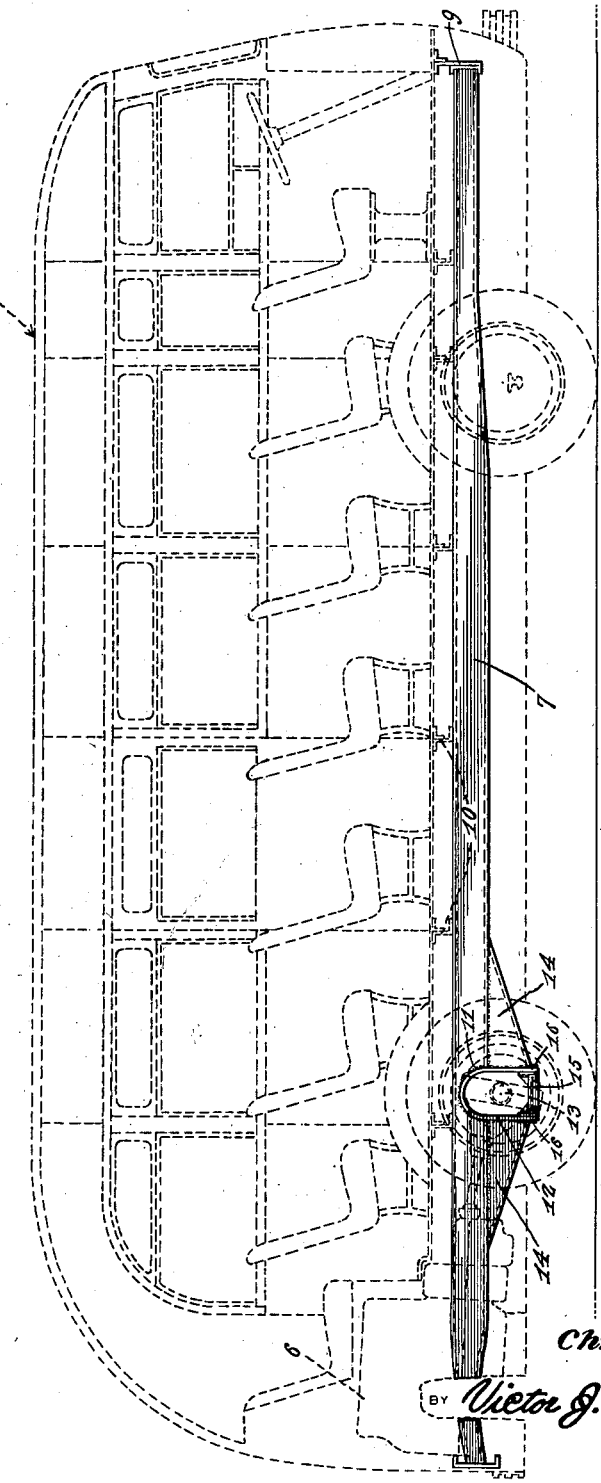
Figure 1 is a side elevational view of a bus mounted on a chassis frame in accordance with the present invention.

Referring to the drawings for a more detailed description thereof, there is disclosed in Figure 1 a bus generally designated by the reference numeral 5, the same being of the type in which the motor 6 is suitably mounted in the rear end of the body and the weight of the motor and the body imparts added strain and stress to the chassis frame as well as the rear axle mounting. The side frame members 7 and 8 of the chassis are substantially C-shaped in cross section, the ends of which are suitably supported in brackets 9. Beams 10 extend transversely of the frame members 7 and 8 to which the floor of the bus or truck is anchored in the conventional manner.

In accordance with the present invention, the lower portion of the frame members 7 and 8 adjacent the rear end is cutaway substantially in the form of a U, as indicated at 11 in Figure 1 of the drawings. This area of the frame members is usually disposed above the rear axle and the same is cutaway to permit the insertion of a yoke 12 of substantially inverted U-shape through which the rear axle 13 projects. The U-shaped yoke 12 extends considerably below the frame members 7 and 8, the same being attached in the cutaway area by welding or other suitable means, said yoke portions serving to materially strengthen the frame members for the mounting of the rear axle.

As best shown in Figures 1 and 4 of the drawings, triangular-shaped reinforcing webs 14 extend from the sides of the yokes for attachment to the frame members 7 and 8. The reinforcing webs are welded or otherwise suitably secured to the sides of the yoke and to the frame members, said reinforcing webs being substantially L-shaped in cross section, as is readily apparent from an inspection of Figure 4.

After placement of the yokes over the axle, the lower ends thereof are connected together by means of a substantially rectangular-shaped spacer bar 15, the same being secured by means of bolts or similar fastening means 16. The provision of the spacer bars 15 will strengthen the frame members 7 and 8 to prevent their becoming distorted when placed under a heavy load or when travelling over inequalities in the surface of the road.

From the above description when taken in connection with the accompanying drawings, it will be readily apparent that the type of frame illustrated and described will materially add strength and stability to trucks and busses of the type mentioned. The cutout of the frame members permits a low mounting for the body and the rear engine mounting but said frame is materially strengthened to such an extent that breaking of the bus body at the roof is substantially precluded.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawings nor to the precise construction described and, therefore, such changes and modifications may be made therein as do not affect the spirit of the invention nor exceed the scope thereof as expressed in the appended claims.

What is claimed is:

1. In a chassis frame for motor vehicles, a pair of spaced frame members, the said frame members being formed to provide oppositely disposed arcuate recesses opening from the lower edges thereof, a yoke having an upper arcuate portion fitted in each of the said recesses and its lower portion depending below the frame member, and reinforcing webs secured to the undersides of the frame members and abutting the sides of each yoke.

2. In a chassis frame for motor vehicles, a pair of longitudinal side frame members, the said frame members being of channel shaped cross section and having transversely opposed arcuate recesses therein opening from the bottom of the said members, an elongated yoke mounted on each of the said side members, each of the said yokes having an upper arcuate end portion fitted in one of the recesses and its major portion depending therefrom, a plurality of longitudinally tapered webs secured to the undersides of the said side members having their enlarged ends abutting the sides of the said yokes, and a spacer bar across the lower end of each of the said yokes.

3. In a chassis frame for motor vehicles, longitudinal side frame members formed with oppositely disposed cutout portions, said frame members being substantially C-shaped in cross section, a yoke of inverted U-shaped formation secured within each cutout portion and extending below said frame members, triangular-shaped web portions attached to the side walls of said yokes and secured to said frame members, and spacer bars secured in the lower end of said yokes.

CHRISTIAN J. HUG.